(12) United States Patent
Fang et al.

(10) Patent No.: US 12,529,553 B2
(45) Date of Patent: Jan. 20, 2026

(54) SENSING MODULE

(71) Applicant: IGIANT OPTICS CO., LTD, Hsinchu Hsien (TW)

(72) Inventors: Zih-Ying Fang, Hsinchu Hsien (TW); Jui-Hsiang Yen, Hsinchu Hsien (TW); Cheng-Huan Chen, Hsinchu Hsien (TW)

(73) Assignee: IGIANT OPTICS CO., LTD, Hsinchu Hsien (TW)

( * ) Notice: Subject to any disclaimer, the term of this patent is extended or adjusted under 35 U.S.C. 154(b) by 164 days.

(21) Appl. No.: 18/323,429

(22) Filed: May 25, 2023

(65) Prior Publication Data

US 2023/0392923 A1 Dec. 7, 2023

(30) Foreign Application Priority Data

Jun. 1, 2022 (TW) .................................. 111120366

(51) Int. Cl.
  *G01B 11/22* (2006.01)
  *G02B 27/09* (2006.01)
(52) U.S. Cl.
  CPC .......... *G01B 11/22* (2013.01); *G02B 27/0961* (2013.01); *G02B 27/0977* (2013.01)
(58) Field of Classification Search
  CPC   G01B 11/22; G02B 27/0961; G02B 27/0977; G01S 7/4814; G01S 7/4815; G01S 7/4817; G01S 17/89; G01S 17/931; G06T 7/514; G06T 7/536
  See application file for complete search history.

(56) References Cited

U.S. PATENT DOCUMENTS

| 2018/0149749 A1* | 5/2018 | Gogolla ............. G02B 27/0988 |
| 2020/0004126 A1 | 1/2020 | Grunnet-Jepsen et al. |
| 2021/0302543 A1 | 9/2021 | McCord |

FOREIGN PATENT DOCUMENTS

| CN | 108633329 | 10/2018 | |
| CN | 108924407 | 11/2018 | |
| CN | 110430415 | 11/2019 | |
| CN | 112859046 | 5/2021 | |
| CN | 113075690 A * | 7/2021 | ............. G01S 17/10 |
| CN | 213690056 | 7/2021 | |
| CN | 213690056 U | 7/2021 | |
| CN | 113296265 | 8/2021 | |
| JP | 2014059301 | 4/2014 | |

(Continued)

OTHER PUBLICATIONS

Machine translation of '690, Guo et al, TOF depth sensing module and image generating method, 2021 (Year: 2021).*

(Continued)

*Primary Examiner* — Tony Ko
(74) *Attorney, Agent, or Firm* — JCIPRNET

(57) ABSTRACT

A sensing module including an illumination device and a sensing device is disclosed. The illumination device is configured to provide an illumination beam or sequentially provide multiple sub-beams having directivity to a sensing area respectively, and the sensing area includes multiple different sub-sensing areas. The sensing device is configured to receive multiple reflected beams from the sub-sensing areas to respectively obtain multiple sub-depth signals, and generate a depth signal according to the sub-depth signals.

23 Claims, 6 Drawing Sheets

(56) References Cited

FOREIGN PATENT DOCUMENTS

| TW | 202024563 | 7/2020 |
| TW | I719325 B | 2/2021 |
| TW | 202113455 | 4/2021 |
| WO | 2019078074 | 4/2019 |
| WO | 2021136527 A1 | 7/2021 |

OTHER PUBLICATIONS

"Office Action of Taiwan Counterpart Application", issued on Jun. 6, 2024, p. 1-p. 9.
"Office Action of China Counterpart Application", issued on Jul. 21, 2025, p. 1-p. 10.
"Notice of Allowance of Taiwan counterpart Application", issued on Oct. 9, 2025, p. 1-p. 7.

* cited by examiner

SENSING MODULE

CROSS-REFERENCE TO RELATED APPLICATION

This application claims the priority benefits of Taiwan application serial no. 111120366, filed on Jun. 1, 2022, and Taiwan application serial no. 112115749, filed on Jun. 1, 2022. The entirety of each of the above-mentioned patent applications is hereby incorporated by reference herein and made a part of this specification.

BACKGROUND

Technical Field

This disclosure relates to an electronic device, in particular to a sensing module.

Description of Related Art

At present, the applications of three-dimensional depth sensing technology range from remote sensing landscape detection at long distances, to unmanned trucks, intelligent machines, vehicle-assisted driving or unmanned vehicles, and unmanned aircraft for factory automation at medium distances, to sweeping robots, gesture recognition devices, and face recognition systems for cell phones at short distances. The rapid development in recent years is mainly driven by the application of this technology in consumer goods and automotive electronics.

A Time of Flight (TOF) ranging device is used in the general application of three-dimensional depth sensing technology. It can be seen from the basic structure of a general Time of Flight ranging device that its planar space resolution is mainly limited by the resolution of the Time of Flight ranging sensor. In the current market, the QVGA (Quarter VGA) specification of 320×240 resolution is the main one. Although Time of Flight ranging devices with a resolution of 640×480 have been developed at present, such devices are still to be improved in the pixel reduction due to avalanche photodiode (APD) or single photon avalanche diode (SPAD), and the whole device is larger in the case of high resolution. At the same time, in the case of a large amount of high-resolution data, it will gradually lose the advantage of very high response time compared with other technologies. In addition, considering the laser safety regulations, the working distance of the Time of Flight ranging device of the surface emitting laser in the existing technology is short, while the working distance of the Time of Flight ranging device of the linear emitting laser is longer with the same energy laser, but the working time is longer for the same working area. Therefore, it is a goal of the field to improve the quality of the Time of Flight ranging devices and to increase the working distance in compliance with the laser safety regulations.

SUMMARY

The disclosure provides a sensing module, capable of further improving sensing resolution and a working distance with a smaller size.

The disclosure provides a sensing module including at least one illumination device and a sensing device. The illumination device is configured to provide an illumination beam or sequentially provide multiple sub-beams having directivity to a sensing area respectively, and the sensing area includes multiple different sub-sensing areas. The sensing device is configured to receive multiple reflected beams from the sub-sensing areas to respectively obtain multiple sub-depth signals, and generate a depth signal according to the sub-depth signals.

In an embodiment of the disclosure, the at least one illumination device includes a light-emitting device to provide the illumination beam or the sub-beams.

In an embodiment of the disclosure, the light-emitting device further includes an optical element disposed on a transmission path of the illumination beam to allow the illumination beam to form the sub-beams to pass through and transmit to the sensing area.

In an embodiment of the disclosure, the optical element includes an optical diffractive element or a light modulating element.

In an embodiment of the disclosure, the light modulating element includes a scanning mirror.

In an embodiment of the disclosure, the illumination beam or the sub-beams are structured light.

In an embodiment of the disclosure, the sub-sensing areas do not overlap with each other.

In an embodiment of the disclosure, the depth signal is obtained by joining the sub-sensing areas in absolute position.

In an embodiment of the disclosure, the sensing device includes an imaging optical element.

In an embodiment of the disclosure, the imaging optical element is a lens array or a scanning moving mirror.

In an embodiment of the disclosure, the imaging optical element has a zoom function.

In an embodiment of the disclosure, the sub-sensing areas partially overlap each other.

In an embodiment of the disclosure, the depth signal is obtained by joining the sub-sensing areas by means of edge comparison.

In an embodiment of the disclosure, the sensing device includes a lens array.

The disclosure further provides an image depth sensing method including the following. An illumination beam is provided or multiple sub-beams having directivity are sequentially provided to a sensing area respectively, the sensing area including multiple different sub-sensing areas. Multiple reflected beams are received from the sub-sensing areas by a sensing device to respectively obtain multiple sub-depth signals. A depth signal is generated according to the sub-depth signals.

In an embodiment of the disclosure, sequentially providing the sub-beams having directivity respectively further includes that an optical element is controlled to form the illumination beam into the sub-beams.

In an embodiment of the disclosure, the optical element includes a diffractive element or a light modulating element.

In an embodiment of the disclosure, the light modulating element includes a scanning mirror.

In an embodiment of the disclosure, the illumination beam or the sub-beams are structured light.

In an embodiment of the disclosure, the sub-sensing areas do not overlap with each other.

In an embodiment of the disclosure, generating the depth signal according to the sub-depth signals further includes that the depth signal is obtained by joining the sub-sensing areas in absolute position.

In an embodiment of the disclosure, the sensing device includes an imaging optical element.

In an embodiment of the disclosure, the imaging optical element is a lens array or a scanning moving mirror.

In an embodiment of the disclosure, the imaging optical element has a zoom function.

In an embodiment of the disclosure, the sub-sensing areas partially overlap each other.

In an embodiment of the disclosure, generating the depth signal according to the sub-depth signals further includes that the depth signal is obtained by joining the sub-sensing areas by means of edge comparison.

In an embodiment of the disclosure, the sensing device includes a lens array.

Based on the above, the sensing module of the disclosure includes the illumination device and the sensing device. The illumination device provides the illumination beam to multiple sub-sensing areas of the sensing area to generate multiple reflected beams. The sensing device receives the reflected beams of different sub-sensing areas to obtain multiple sub-depth signals. Furthermore, a signal data processing may be used to obtain depth signals with greater resolution. In this way, the sensing resolution of the sensing module and the working distance may be further improved, and the sensing module has a smaller size.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
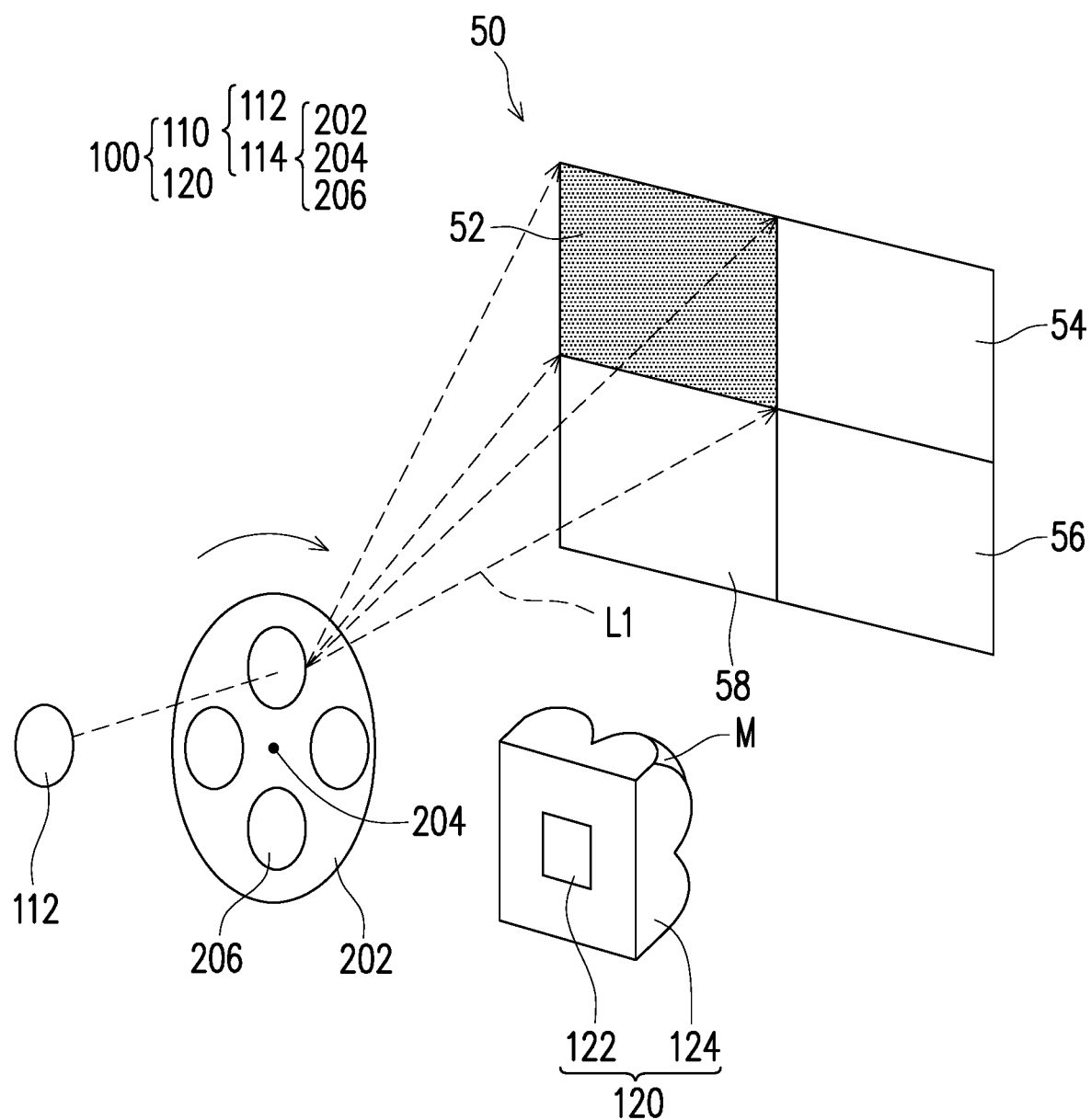
FIG. 1A to FIG. 1D are schematic diagrams of a sensing module according to an embodiment of the disclosure transmitting an illumination beam at different time sequences.
Figure 1B:
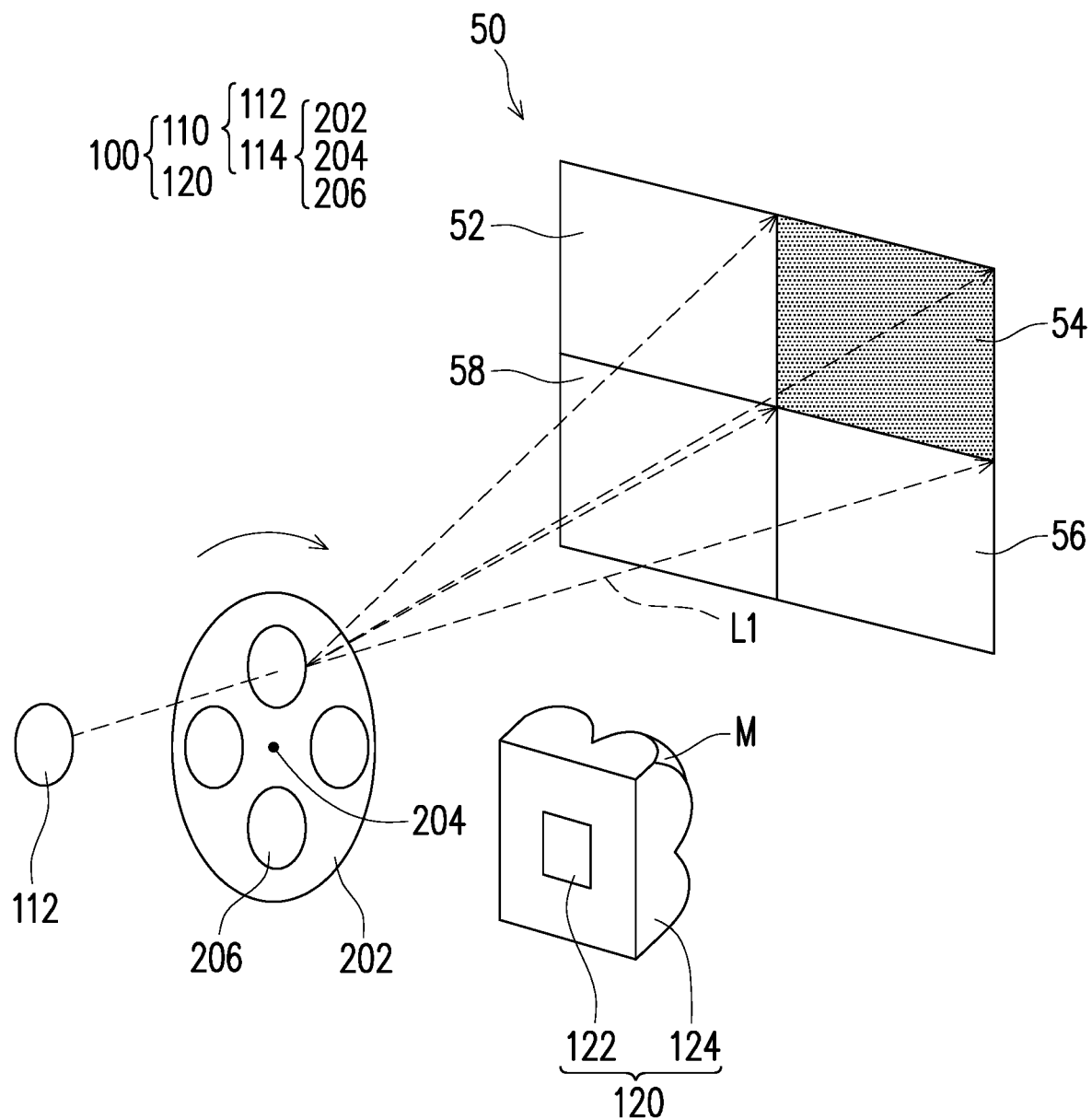
Figure 1C:
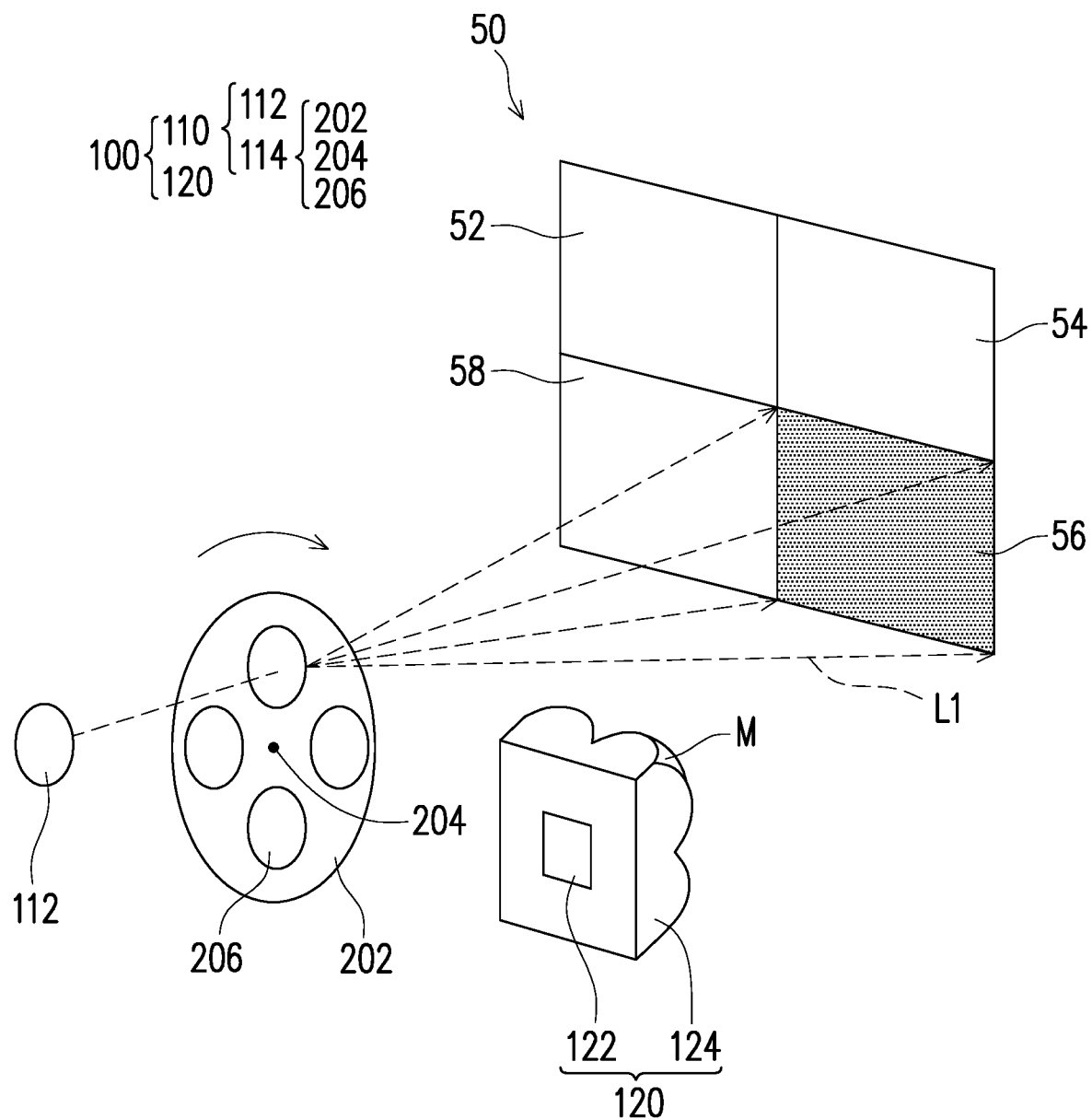
Figure 1D:
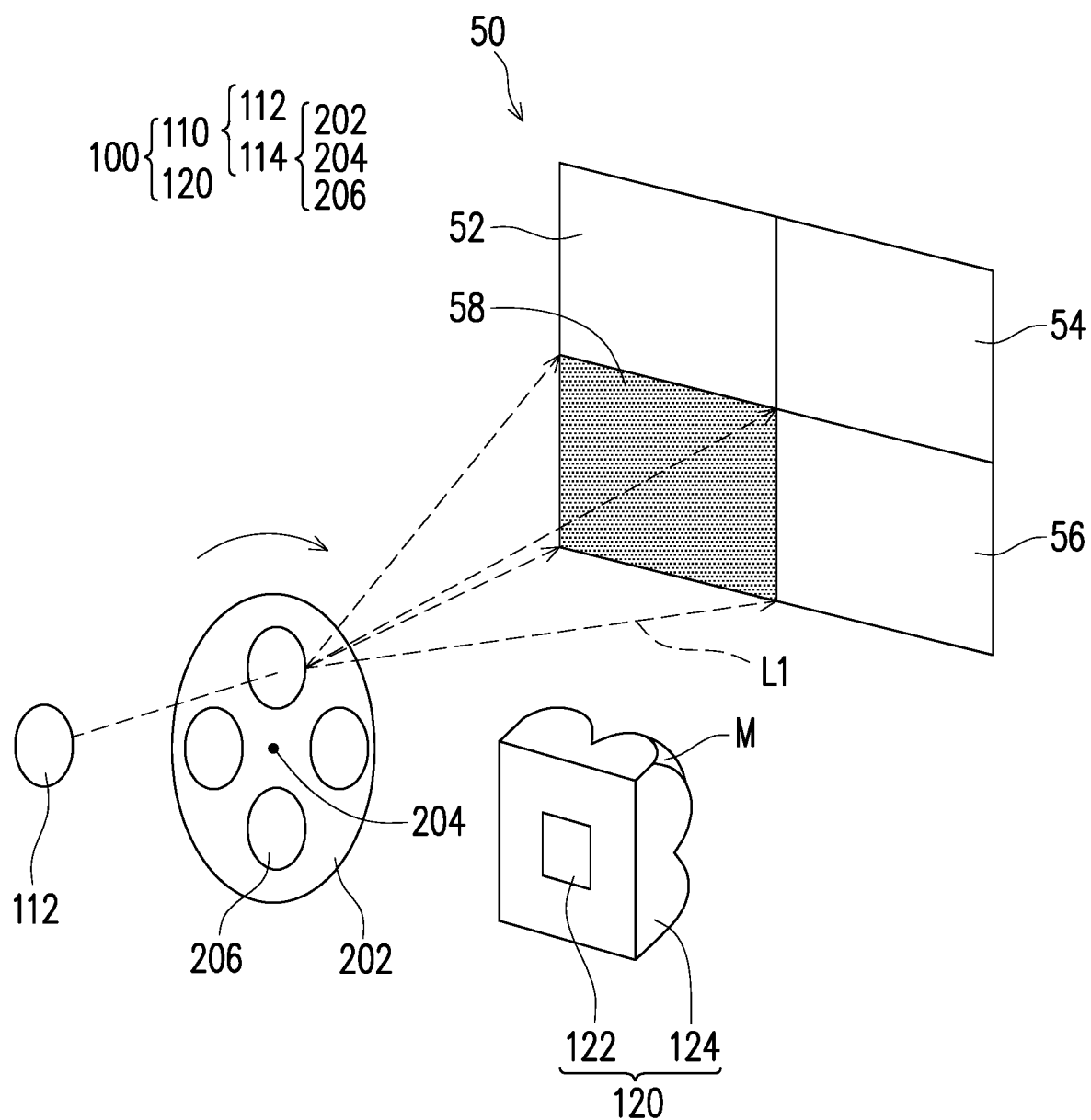
Figure 2:
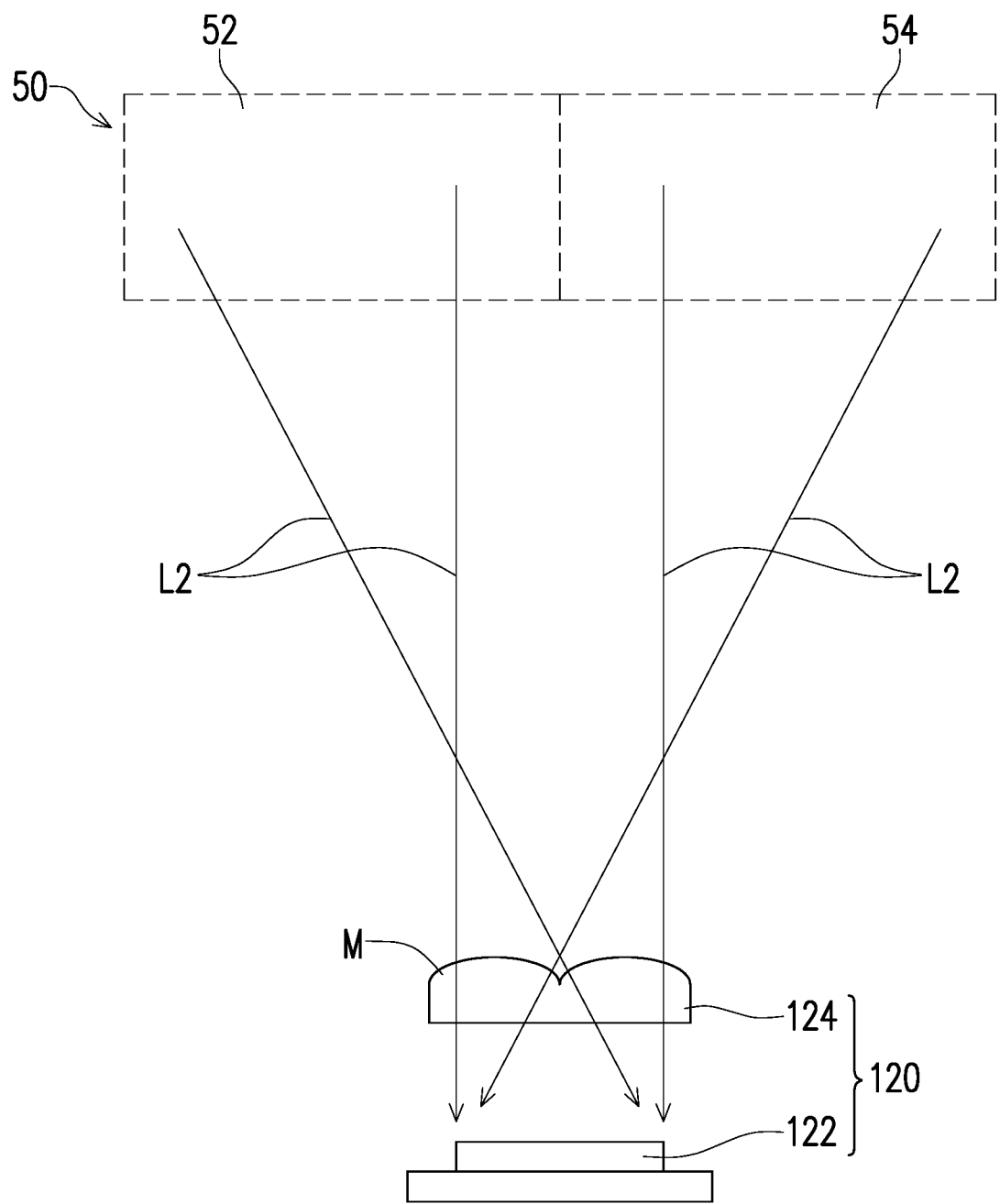
FIG. 2 is a schematic diagram of a sensing device of the sensing module in FIG. 1A receiving multiple reflected beams.

FIG. 1A to FIG. 1D are schematic diagrams of a sensing module according to an embodiment of the disclosure transmitting an illumination beam at different time sequences. FIG. 2 is a schematic diagram of a sensing device of the sensing module in FIG. 1A receiving multiple reflected beams. Referring to FIG. 1A to FIG. 1D first, the disclosure provides a sensing module 100, which is, for example, a Time of Flight ranging device with structured light illumination, for providing structured light to a sensing target and using Time of Fight technology for three-dimensional depth sensing, which can be applied in various fields such as geomorphological exploration, intelligent machinery, vehicle-assisted driving, unmanned devices, cell phone recognition devices. The sensing target may be any tangible object, and the disclosure is not limited thereto.

In this embodiment, the sensing module 100 includes a light-emitting device 110 and a sensing device 120. The light-emitting device 110 is configured to provide an illumination beam L1 to the sensing target, and the sensing device 120 is configured to receive a reflected beam L2 reflected by the sensing target for sensing. In detail, a surface of the sensing target sensed by the sensing module 100 may be defined as a sensing area 50, and the sensing area 50 may include multiple sub-sensing areas 52, 54, 56, and 58 as defined. In this embodiment, the sub-sensing areas 52, 54, 56, and 58 do not overlap with each other. For example, area contours of the sub-sensing areas 52, 54, 56, and 58 are rectangular, and the area contours of the sub-sensing areas 52, 54, 56, and 58 may be spliced to form the sensing area 50, as shown in FIG. 1A. However, in different embodiments, the sub-sensing areas 52, 54, 56, and 58 may also be designed to overlap with each other and cover the entire sensing area 50, and the disclosure is not limited thereto. The following description will be exemplified by the four sub-sensing areas 52, 54, 56, and 58 that can be spliced to form the sensing area 50.

In detail, the light-emitting device 110 includes a light-emitting element 112 and an optical element 114. The light-emitting element 112 provides the illumination beam L1. For example, in this embodiment, the light-emitting element 112 is, for example, a light-emitting diode (LED) or a laser diode (LD), and the illumination beam L1 is, for example, an infrared beam. The optical element 114 is disposed on a transmission path of the illumination beam L1 to transmit the illumination beam L1 to the sub-sensing areas 52, 54, 56, and 58 of the sensing area 50 to generate multiple reflected beams L2. Specifically, the optical element 114 includes a wheel 202, a rotating shaft 204, multiple diffractive elements 206, and a driving element (not shown). The rotating shaft 204 is disposed at a rotation center of the wheel 202. The diffractive elements 206 are disposed on the wheel 202 and surround the rotating shaft 204. The driving element is connected to the rotating shaft 204, and the driving element is a motor, for example, to drive the rotating shaft 204 to rotate. Thus, the illumination beam L1 will be transmitted at any time through the different diffractive elements 206. The driving element may optionally be disposed on the wheel 202 or elsewhere, and the disclosure is not limited thereto.

In this embodiment, a number of the diffractive elements 206 is the same as a number of the sub-sensing areas 52, 54, 56, and 58, i.e., for example, the same four. The diffractive elements 206 are, for example, diffractive optical elements (DOE) that allow the passing illumination beam L1 to be formed as structured light and to give a specific directivity. For example, as shown in FIG. 1A to FIG. 1D respectively, in this embodiment, when the illumination beam L1 is transmitted in time sequence through the different diffractive elements 206, structured light irradiating the different sub-sensing areas 52, 54, 56, and 58 is generated. The transmission of the illumination beam L1 through the different diffractive elements 206 in time sequence may be implemented by rotating the wheel 202 to replace the diffractive element 206 on an optical axis. In other words, this embodiment irradiates the illumination beam L1 in different directions through the different diffractive elements 206 to form structured light corresponding to the sub-sensing areas 52, 54, 56, and 58, and the light will be reflected back to the sensing module 100 by each of the sub-sensing areas 52, 54, 56, and 58 in different directions, i.e., as the reflected beams L2 received by the sensing device 120. However, in various embodiments, other means may be used to transmit the illumination beam L1 to the sub-sensing areas 52, 54, 56, and 58 of the sensing area 50, and the disclosure does not limit the type and form of the optical element 114.

Referring to FIG. 2, for illustration purposes, FIG. 2 shows only a portion of the sensing area 50, with the sub-sensing areas 52 and 54 as examples. On the other hand, the sensing device 120 includes a sensing element 122 and a lens array 124. The sensing element 122 is disposed on transmission paths of the reflected beams L2, and is configured to receive the reflected beams L2 to generate multiple sub-sensing signals. The sensing element 122 is, for example, an infrared sensor. For example, this embodiment uses a ToF sensor with a resolution of 320×240. The lens array 124 is disposed on the sensing element 122. The lens array 124 includes multiple sub-lenses M respectively disposed on the transmission paths of the reflected beams L2. In other words, the number of the sub-sensing areas 52, 54, 56, and 58 is the same as a number of the sub-lenses M. In this embodiment, the number of the sub-lenses M is four, i.e., in a form of a 2×2 lens array, and the four sub-lenses M are correspondingly disposed on the transmission paths of the four different reflected beams L2. The sub-lenses M may respectively receive the reflected beam L2 reflected by the different sub-sensing areas 52, 54, 56, and 58 for transmission to a single sensing element 122. In other words, since the sensing element 122 may receive the reflected beam L2 with a resolution up to 320×240, as the illumination device 110 provides the illumination beam L1 to the different sub-sensing areas 52, 54, 56, and 58 at any time, the sensing element 122 will receive the reflected beams L2 reflected from the different sub-sensing areas 52, 54, 56, and 58 at any time, and the reflected beams L2 may respectively generate a sub-sensing signal with a resolution of 320×240, and by sub-signal data processing of the sub-sensing signals corresponding to the different sub-sensing areas 52, 54, 56, and 58, a sensing signal with a resolution of up to 640×480 is obtained. In this way, the sensing resolution of the sensing module 100 may be further improved, and the sensing module 100 has a smaller size. In some embodiments, the sensing module 100 may include a processing device electrically connected to the sensing element 122 to generate a sensing signal according to the sub-sensing signals. The processing device is, for example, a central processing unit (CPU) or other types of processors, and the disclosure is not limited thereto.

Figure 3:
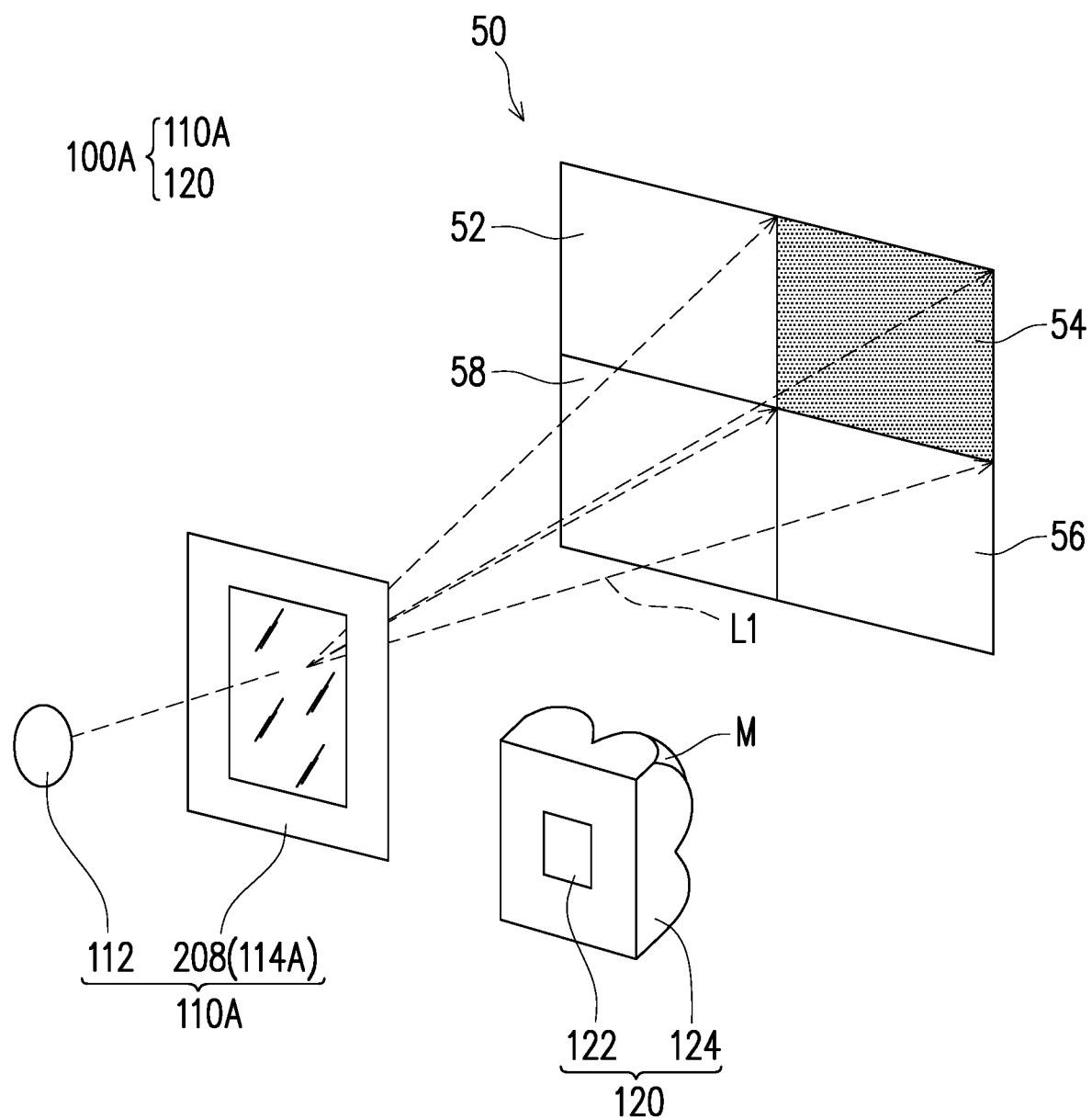
FIG. 3 is a schematic diagram of sensing by a sensing module according to another embodiment of the disclosure.

FIG. 3 is a schematic diagram of sensing by a sensing module according to another embodiment of the disclosure. Referring to FIG. 3, a sensing module 100A of this embodiment is similar to the sensing module 100 shown in FIG. 1A. The difference is that, in this embodiment, an optical element 114A in a light-emitting device 110A includes a light modulating element 208 disposed on a transmission path of an illumination beam L1 and configured to transmit the illumination beam L1 to different multiple sub-sensing areas 52, 54, 56, and 58. The light modulating element 208 is, for example, a spatial light modulator (SLM). The light modulating element 208 is electrically controlled to change a state thereof at any time so that the passing illumination beam L1 may change a transmission direction thereof at any time and be transmitted to the different sub-sensing areas 52, 54, 56, and 58. In this way, a sensing resolution of the sensing module 100A may be further improved, and the sensing module 100A has a smaller size.

In the embodiment shown in FIG. 1A to FIG. 1D or FIG. 3, the sensing area 50 may also be optionally defined into nine sub-sensing areas, and image depth information with a higher resolution may be obtained by combining the light-emitting device 110 disposed to provide the illumination beam L1 to the nine different sub-sensing areas with the lens array 124 in a form of a 3×3 lens array. In other words, the disclosure does not limit the number of the illumination beam L1 projected to the different sub-sensing areas.

In the embodiments of FIG. 1A to FIG. 1D or FIG. 3, the area of the sensing area 50 may also be optionally reduced to ¼ of the original area, thus achieving a longer working distance with the same area. The disclosure does not limit the size of the area in which the illumination beam L1 is projected to the different sub-sensing areas.

To sum up, the sensing module of the disclosure includes the illumination device and the sensing device. The illumination device provides the illumination beam to multiple sub-sensing areas of the sensing area to generate multiple reflected beams. The sensing device receives the reflected beams of the different sub-sensing areas to obtain multiple sub-depth signals. Furthermore, a signal data processing may be used to obtain depth signals with greater resolution. In this way, the sensing resolution and the working distance of the sensing module may be further improved, and the sensing module has a smaller size.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. A sensing module comprising:
   at least one illumination device configured to sequentially provide an illumination beam to a plurality of sub-sensing areas of a sensing area so as to generate a plurality of reflected beams; and
   a sensing device configured to receive the plurality of reflected beams from the plurality of sub-sensing areas to respectively obtain a plurality of sub-depth signals, and generate a depth signal according to the plurality of sub-depth signals, wherein the sensing device comprises a lens array.

2. The sensing module according to claim 1, wherein the at least one illumination device comprises a light-emitting device to provide the illumination beam or the sub-beams.

3. The sensing module according to claim 2, wherein the light-emitting device further comprises an optical element disposed on a transmission path of the illumination beam to allow the illumination beam to form the sub-beams to pass through and transmit to the sensing area.

4. The sensing module according to claim 2, wherein the optical element comprises an optical diffractive element or a light modulating element.

5. The sensing module according to claim 1, wherein the illumination beam or the sub-beams are structured light.

6. The sensing module according to claim 1, wherein the sub-sensing areas do not overlap with each other.

7. The sensing module according to claim 6, wherein the depth signal is obtained by splicing the sub-sensing areas in absolute position.

8. The sensing module according to claim 6, wherein the sensing device comprises an imaging optical element.

9. The sensing module according to claim 8, wherein the imaging optical element is a lens array or a scanning moving mirror.

10. The sensing module according to claim 9, wherein the imaging optical element has a zoom function.

11. The sensing module according to claim 1, wherein the sub-sensing areas partially overlap each other.

12. The sensing module according to claim 11, wherein the depth signal is obtained by splicing the sub-sensing areas by means of edge comparison.

13. An image depth sensing method comprising:
   providing an illumination beam to a plurality of sub-sensing areas of a sensing area so as to generate a plurality of reflected beams;

receiving the plurality of reflected beams from the plurality of sub-sensing areas by a sensing device to respectively obtain a plurality of sub-depth signals, wherein the sensing device comprises a lens array; and
generating a depth signal according to the plurality of sub-depth signals.

14. The image depth sensing method according to claim 13, wherein sequentially providing the sub-beams having directivity respectively further comprises:
controlling an optical element to form the illumination beam into the sub-beams.

15. The image depth sensing method according to claim 14, wherein the optical element comprises a diffractive element or a light modulating element.

16. The image depth sensing method according to claim 13, wherein the illumination beam or the sub-beams are structured light.

17. The image depth sensing method according to claim 13, wherein the sub-sensing areas do not overlap with each other.

18. The image depth sensing method according to claim 17, wherein generating the depth signal according to the sub-depth signals further comprises:
obtaining the depth signal by splicing the sub-sensing areas in absolute position.

19. The image depth sensing method according to claim 17, wherein the sensing device comprises an imaging optical element.

20. The image depth sensing method according to claim 19, wherein the imaging optical element is a lens array or a scanning moving mirror.

21. The image depth sensing method according to claim 20, wherein the imaging optical element has a zoom function.

22. The image depth sensing method according to claim 13, wherein the sub-sensing areas partially overlap each other.

23. The image depth sensing method according to claim 22, wherein generating the depth signal according to the sub-depth signals further comprises:
obtaining the depth signal by splicing the sub-sensing areas by means of edge comparison.

* * * * *